UNITED STATES PATENT OFFICE.

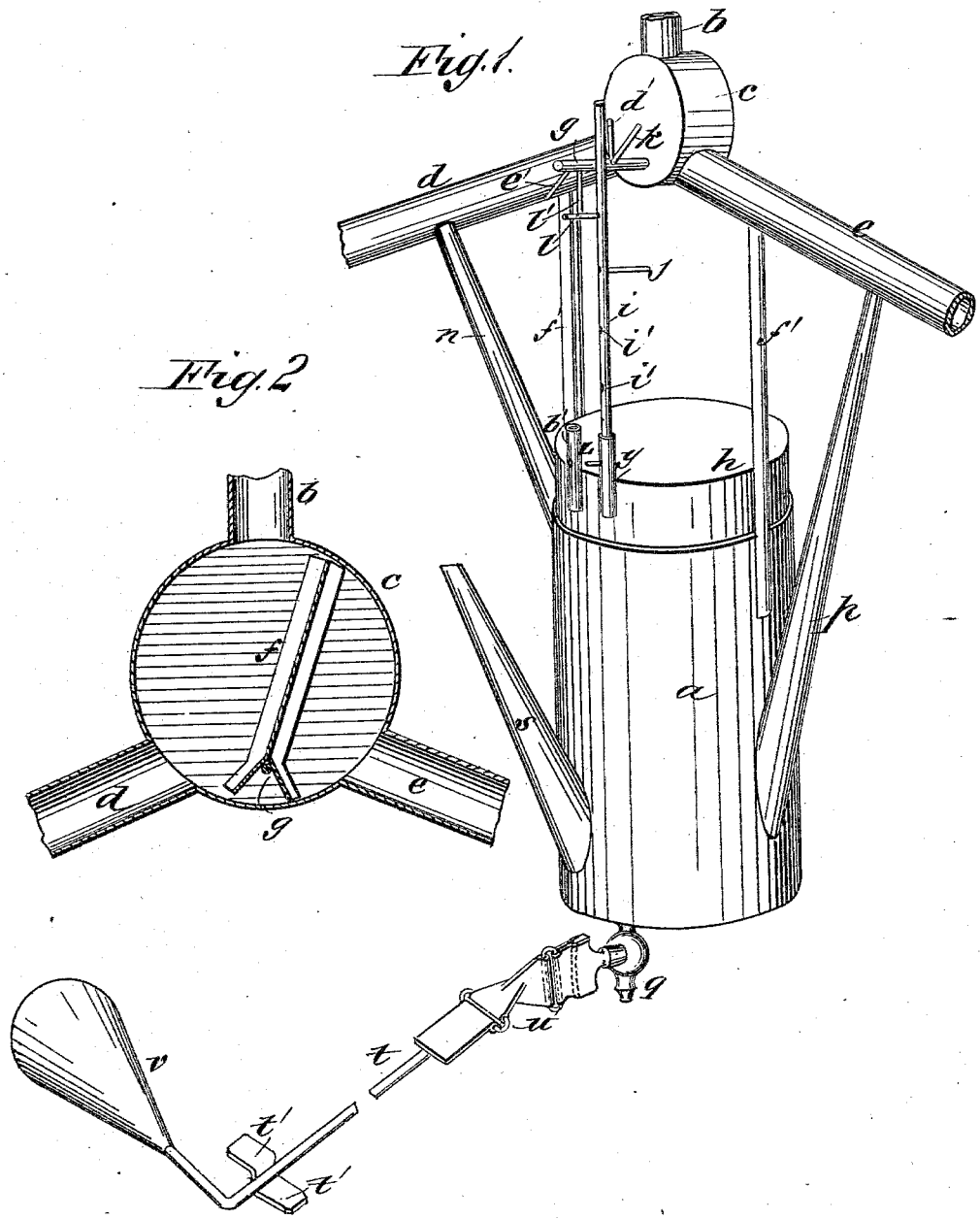

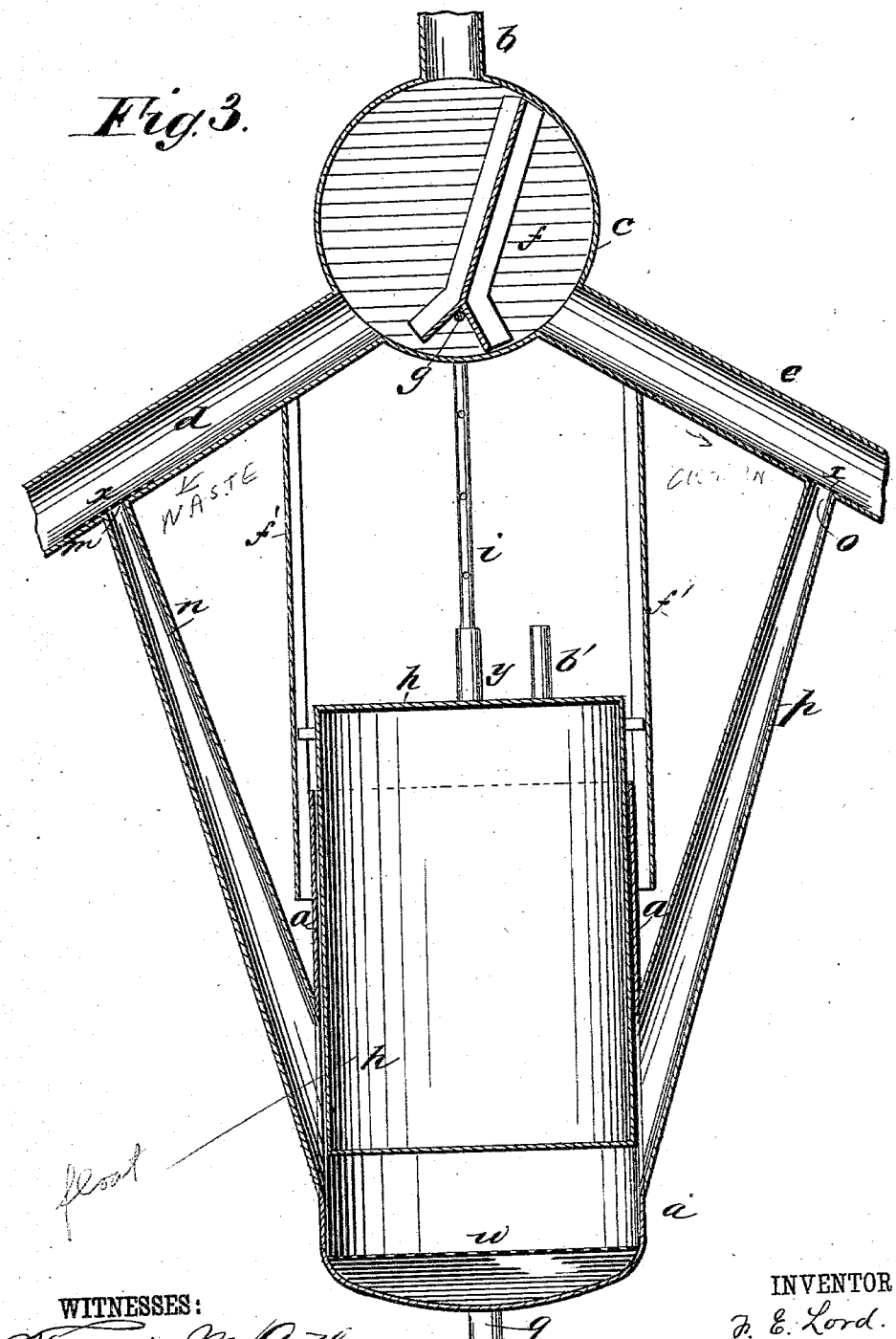

FREDERICK E. LORD, OF ST. LOUIS, MISSOURI.

AUTOMATIC RAIN-WATER REGULATOR FOR CISTERNS.

SPECIFICATION forming part of Letters Patent No. 295,258, dated March 18, 1884.

Application filed August 10, 1883. (No model.)

*To all whom it may concern:*

Be it known that I, FREDERICK E. LORD, of St. Louis, Missouri, have invented a new and Improved Automatic Rain-Water Regulator for Cisterns, of which the following is a full, clear, and exact description.

The object of the invention is to improve automatic rain-water regulators for cisterns, as hereinafter described, and pointed out in the claims.

Reference is to be had to the accompanying drawings, forming part of this specification, in which similar letters of reference indicate corresponding parts in all the figures.

Figure 1 is a perspective view of the apparatus which I employ for carrying out my invention. Fig. 2 is a sectional elevation of the valve employed for turning the water from one course to another, and Fig. 3 is a sectional elevation of the apparatus represented in Fig. 1.

I provide a small tank, $a$, of sheet metal, wood, or other material, placing it at any convenient place on the surface of the ground near the cistern, and where the water from the roof of the building can be received into the pipe $b$, which discharges into the valve-case $c$, out of which a waste-pipe, $d$, discharges from one side, and cistern-pipe $e$ from the other side. A valve, $f$, is arranged in the valve-case $c$ on a pivot, $g$, to turn the water one way or the other, according to which way it may be set, by a float, $h$, located in the tank $a$, and having a stem or rod, $i$, with a pin, $j$, which will bear against arm $k$ of the valve-stem when the float $h$ rises and shift the valve $f$, so as to cause the water to flow through cistern-pipe $e$; and said stem $i$ has another pin, $l$, which, when the float descends, will press on arm $l'$ and shift the valve back to the position represented in Figs. 2 and 3, for discharging the water through the waste-pipe $d$. To cause the float $h$ to rise and shift the valve $f$ to turn the clean water into the cistern after the dirty water has passed off through pipe $d$, said pipe has a small opening at $m$, connecting with a pipe, $n$, through which a small portion of the escaping water is allowed to pass into the tank, to raise the float slowly and turn the valve at such time after the rain begins that the dirty water will have passed away. The pipe $e$ also has a small opening through it at $o$, connecting with a pipe, $p$, which discharges into the tank $a$, to maintain a supply therein to keep the float up while the rain continues, so as not to shift the valve until the rain ceases, said tank having a cock, $q$, that is never allowed to quite close, so that the escape of the water from under the float to shift the valve $f$ and set it ready for the next rain will always be insured. In case too much water enters the tank $a$, it may escape by the pipe $s$.

The waste-cock $q$ is to be connected by a shaft, $t$, having a universal joint, $u$, (if necessary,) to a float, $v$, located in the cistern, and is to be connected and arranged so that when the cistern is full the cock $q$ will be opened wide, to prevent the float $h$ from rising and permit all the water to pass off through the waste-pipe $d$. The shaft $t$ is to be arranged in any suitable bearings for support, and the float $v$ will have the proper means of guiding it rightly in shifting the cock. Said shaft is to have stops $t'$, to limit its range of motion properly, to which stops any suitable fixed bearings will be provided. A strainer, $w$, is placed in the bottom of the tank, to prevent the cock $q$ from being clogged with the washings from the roof, which will escape through pipe $s$, or may be cleared out from time to time, and strainers $x$ are placed over the openings $m$ and $o$ in the pipes $d$ and $e$, to prevent such matters from passing into the tank as much as possible.

The rod $i$ is connected to the top of the float by a socket, $y$, and a set-screw, $z$, and pin $j$ is fitted so as to be shifted along up or down the rod $i$, which has a series of holes, $i'$, for the purpose, by which the time of shifting the valve after the rain begins will be varied, to allow the roof to be washed more or less before turning the water into the cistern. By shifting the rod $i$ over into another socket, $b'$, to act on arms $d'$ and $e'$ on the opposite side of the valve-stem $g$, the pipe $e$ may be used for the waste-pipe, and pipe $d$ for the cistern-pipe, which may be a convenience sometimes in setting up the apparatus. The pipes $d$ and $e$ are supported on uprights $f'$, attached to the tank, which form guides to the float. They also have support by the pipes $n$ and $p$.

This improved regulator may be attached to the house or placed on the surface of the ground at any distance required from the cistern.

Having thus described my invention, I claim as new and desire to secure by Letters Patent—

1. The tank $a$, having upwardly-extending pipe $n$, in combination with a superposed case having water-inlet pipe $b$, waste-pipe $d$, connected with pipe $n$ by a wire-gauze-covered hole, $m$, and the cistern-pipe $c$, placed on the opposite side to pipe $d$, whereby as the water passes through the waste-pipe some will pass through hole $m$ and pipe $n$ into the tank, to raise the float, as and for the purpose described.

2. The combination, with the tank $a$, having upwardly-projecting pipes $p$ $s$, of the superposed case having a cistern-pipe, $c$, connected with pipe $p$, whereby the float will be maintained in a position to retain the valve tilted at its upper end on the side of pipe $b$ opposite to that on which the cistern-pipe is situated, so that as long as the rain continues the water will be poured uninterruptedly into the cistern.

3. The combination, with the valve-pivot $g$ and the float-stem $i$, of the arms $j$ $k$ $l$ $l'$, whereby the valve will be automatically operated, as described.

FREDERICK E. LORD.

Witnesses:
ARCHIE WHITELOW,
GEO. WALKER.